United States Patent

Takei

[11] Patent Number: 5,684,344
[45] Date of Patent: Nov. 4, 1997

[54] DRIVE UNIT

[75] Inventor: Seiji Takei, Kanagawa, Japan

[73] Assignee: Nippon Thompson Co., Ltd., Tokyo, Japan

[21] Appl. No.: 306,376

[22] Filed: Sep. 15, 1994

[30] Foreign Application Priority Data

Sep. 24, 1993 [JP] Japan .................. 5-261696

[51] Int. Cl.[6] .................. H02K 41/02; B60L 13/00
[52] U.S. Cl. .................. 310/12; 104/294
[58] Field of Search .................. 310/12; 104/290, 104/292, 294; 361/749, 789, 826, 827; 384/43

[56] References Cited

U.S. PATENT DOCUMENTS

| 901,435 | 10/1908 | Fuller | 310/12 |
|---|---|---|---|
| 1,020,942 | 3/1912 | Bachelet | 104/290 |
| 2,144,835 | 1/1939 | Dickinson | 310/12 |
| 4,713,497 | 12/1987 | Smith | 439/164 |
| 4,825,111 | 4/1989 | Hommes et al. | 310/12 |
| 4,844,624 | 7/1989 | Teramachi | 310/43 |
| 4,945,268 | 7/1990 | Nihei et al. | 310/12 |
| 4,965,864 | 10/1990 | Roth et al. | 310/12 |
| 5,127,599 | 7/1992 | Veraart | 104/292 |
| 5,130,895 | 7/1992 | Somemiya et al. | 361/398 |
| 5,225,725 | 7/1993 | Shiraki et al. | 310/12 |
| 5,287,026 | 2/1994 | Ogihara et al. | 310/12 |

FOREIGN PATENT DOCUMENTS

| 414471 | 7/1946 | Italy | 310/12 |
|---|---|---|---|
| 63-110949 | 5/1988 | Japan | 310/12 |
| 63-213454 | 9/1988 | Japan | 310/12 |
| 4-109858 | 4/1992 | Japan | 310/12 |
| 1051663 | 10/1983 | U.S.S.R. | 310/12 |

Primary Examiner—Clayton E. Laballe
Attorney, Agent, or Firm—Sughrue, Mion, Zinn, Macpeak & Seas, PLLC

[57] ABSTRACT

A drive unit including a curved track rail having a first radius of curvature, a curved slide member which moves along the track rail and has a second radius of curvature substantially equal to the first radius of curvature, and a driving device such as an electromagnetic actuator for driving the slide member along the track rail. The driving device includes a primary side connected to the track rail and a secondary side connected to the slide member, and the drive unit may also include a position detecting device connected to the slide member and a flexible substrate connected between the position detecting device and the primary side for transmitting and receiving electrical signals indicative of a relative position of the slide member. The flexible substrate is disposed so as to be flexible in a radial direction of the track rail and the slide member.

5 Claims, 7 Drawing Sheets

DRIVE UNIT

BACKGROUND OF THE INVENTION

1. Field of the Invention

The present invention relates to a drive unit including a guide unit, which supports an object to be moved and guides such with high accuracy, and a driving device in the form of a linear electromagnetic actuator which drives said guide unit.

2. Description of the Prior Art

This type of drive unit of the prior art is mainly used in the movement mechanisms of, for example, machine tools and industrial robots. An example of this type of drive unit of the prior art is shown in FIG. 1.

As shown in the drawing, this type of drive unit has a track rail in the form of linear, long base member 1, and a slider in the form of moving body 2 which moves along said base member 1. More specifically, a plurality of rollers (not shown) are provided in moving body 2, and these rollers roll over a track (not shown) formed along the lengthwise direction of base member 1.

Overhang 1a is formed on one side of base member 1, and a detected element in the form of linear scale 4 is provided on said overhang 1a over roughly its entire length. In contrast, small bracket 2a is provided on the side of moving body 2, and detecting elements in the form of light emitting element 5a and light receiving element 5b are mounted on said small bracket 2a. A position detection device for detecting the position of moving body 2 with respect to base member 1 is thus composed by linear scale 4, light emitting element 5a and light receiving element 5b.

On the other hand, a linear electromagnetic actuator, in this case a linear direct current motor, which composes the above-mentioned guide unit together with a drive unit, is composed in the manner described below.

As shown in the drawing, said linear direct current motor is composed of a primary side, equipped with a large number of armature coils 7 arranged in a row in the lengthwise direction of base member 1 on said base member 1, and a secondary side, having a field magnet (not shown) attached to the lower surface of moving body 2 to oppose each of said armature coils 7. Each armature coil 7 is wound into the shape of a rectangular loop and is affixed to coil substrate 8. Moreover, each said armature coil 7 is fastened together with said coil substrate 8 to base member 1 by small screws 9. In addition, the above-mentioned field magnet is magnetized so that a plurality of N and S magnetic poles are arranged in alternating fashion along the direction in which moving body 2 is to move, namely the lengthwise direction of base member 1.

In the drive unit having the above-mentioned constitution, by supplying a prescribed electric current to armature coils 7, thrust is produced between the primary and secondary sides based on Fleming's right-hand rule. For example, if base member 1 to which the primary side is coupled is taken to be the stationary side, moving body 2 integrated into a single unit with the secondary side is moved by this thrust. The position of moving body 2 with respect to base member 1 is then detected by the position detection device described above.

Although the above-mentioned drive unit of the prior art is suitable for use in movement mechanisms which perform simple linear, reciprocating operation in an apparatus such as an industrial robot, there has been recently a growing need for the development of a drive unit which is able to accommodate the operating modes of increasingly complex apparatuses.

SUMMARY OF THE INVENTION

Therefore, the object of the present invention is to provide a drive unit that contributes to diversification of the operating mode of the apparatus into which it is to be incorporated.

The present invention comprises a drive unit which mutually couples a track rail, in which tracks are formed in the lengthwise direction, and a slider able to freely perform relative movement with respect to said track rail, said track rail and said slider having a prescribed curvature in the direction of relative movement.

DESCRIPTION OF THE PREFERRED EMBODIMENTS

The following provides an explanation of a drive unit as an embodiment of the present invention with reference to the attached drawings. The drive unit includes a guide unit, which supports an object to be moved and guides such with high accuracy, and a driving device in the form of a linear electromagnetic actuator which drives said guide unit. In the case of the present embodiment, a moving magnet type of linear direct current motor is employed for said linear electromagnetic actuator. However, a moving coil type of linear direct current motor, linear pulse motor or various other types of devices can naturally also be applied as the linear electromagnetic actuator.

To begin with, the following provides an explanation of the above-mentioned guide unit.

Figure 1:
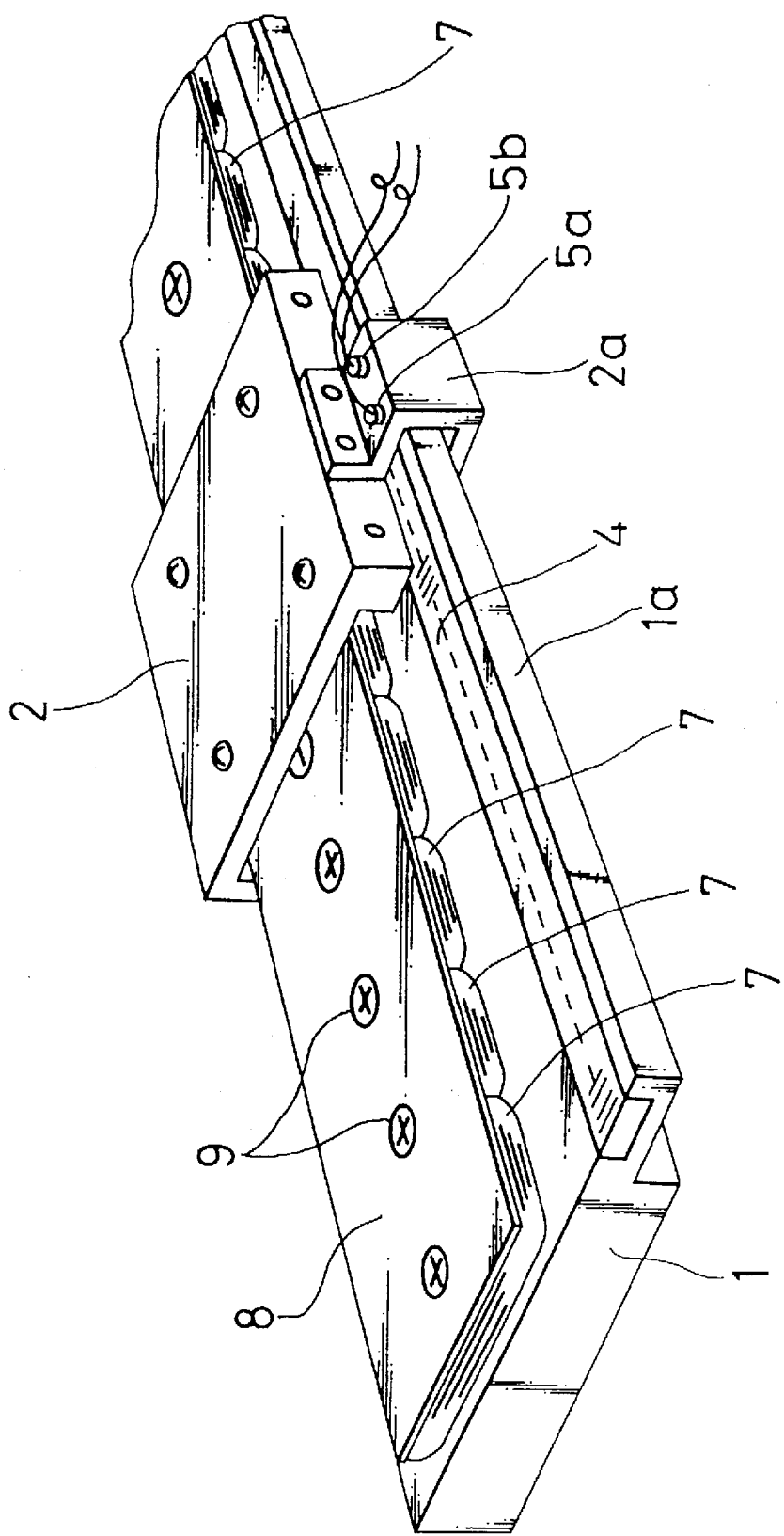
FIG. 1 is a perspective view of the essential portion of a drive unit of the prior art.
Figure 2:
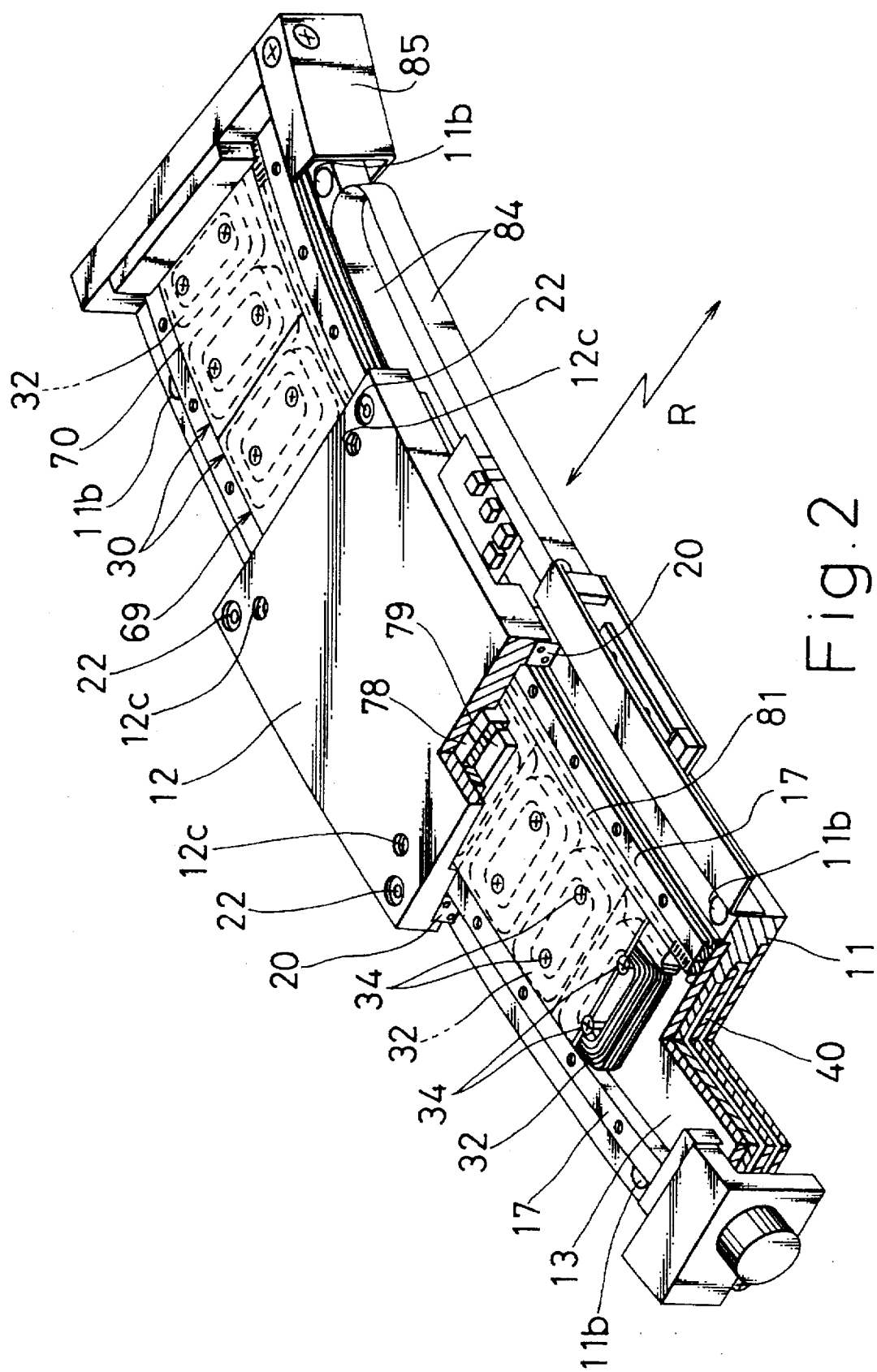
FIG. 2 is a perspective view, including a partial cross-section, of a drive unit as an embodiment of the present invention.
Figure 3:
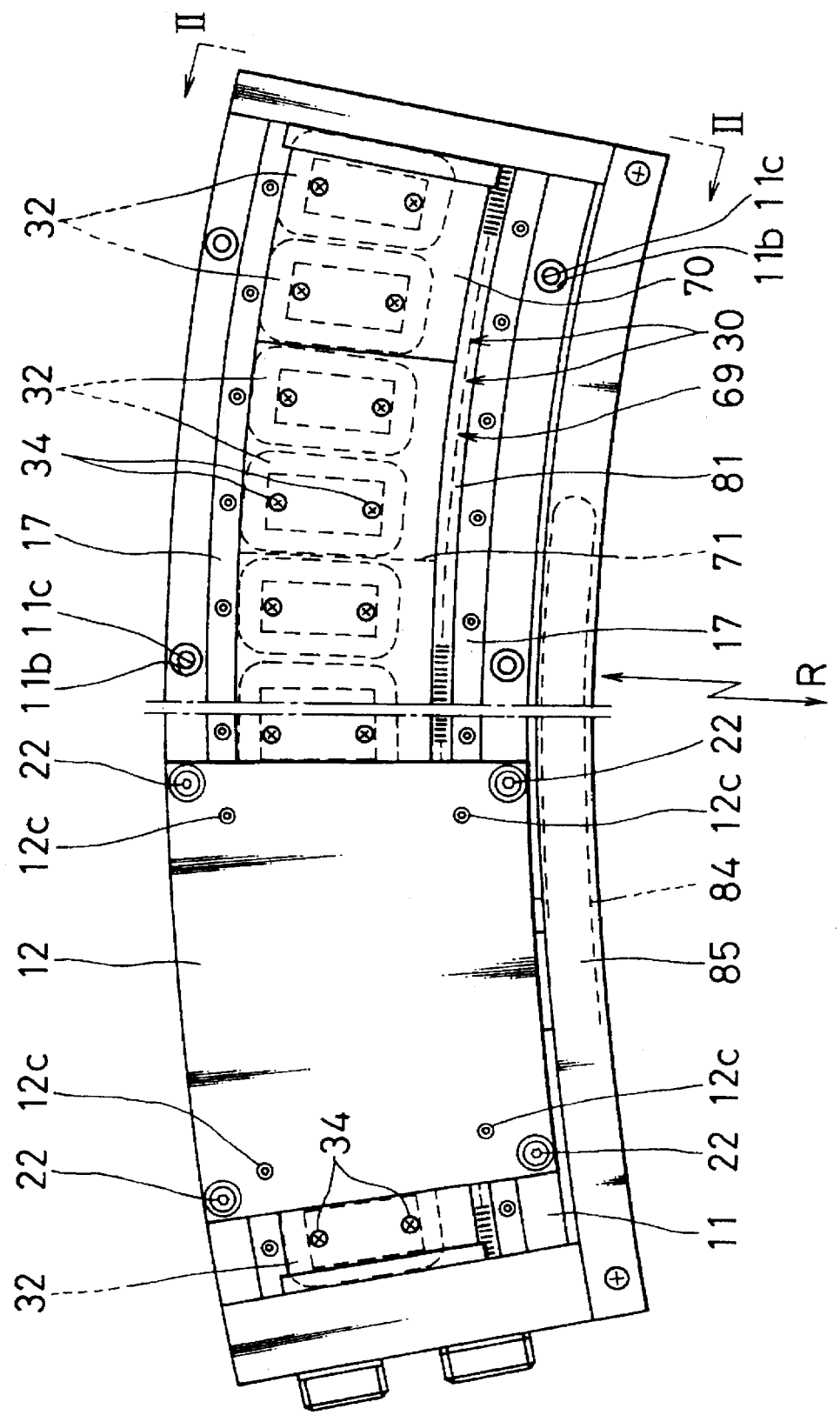
FIG. 3 is an overhead view of the drive unit shown in FIG. 2.
Figure 4:
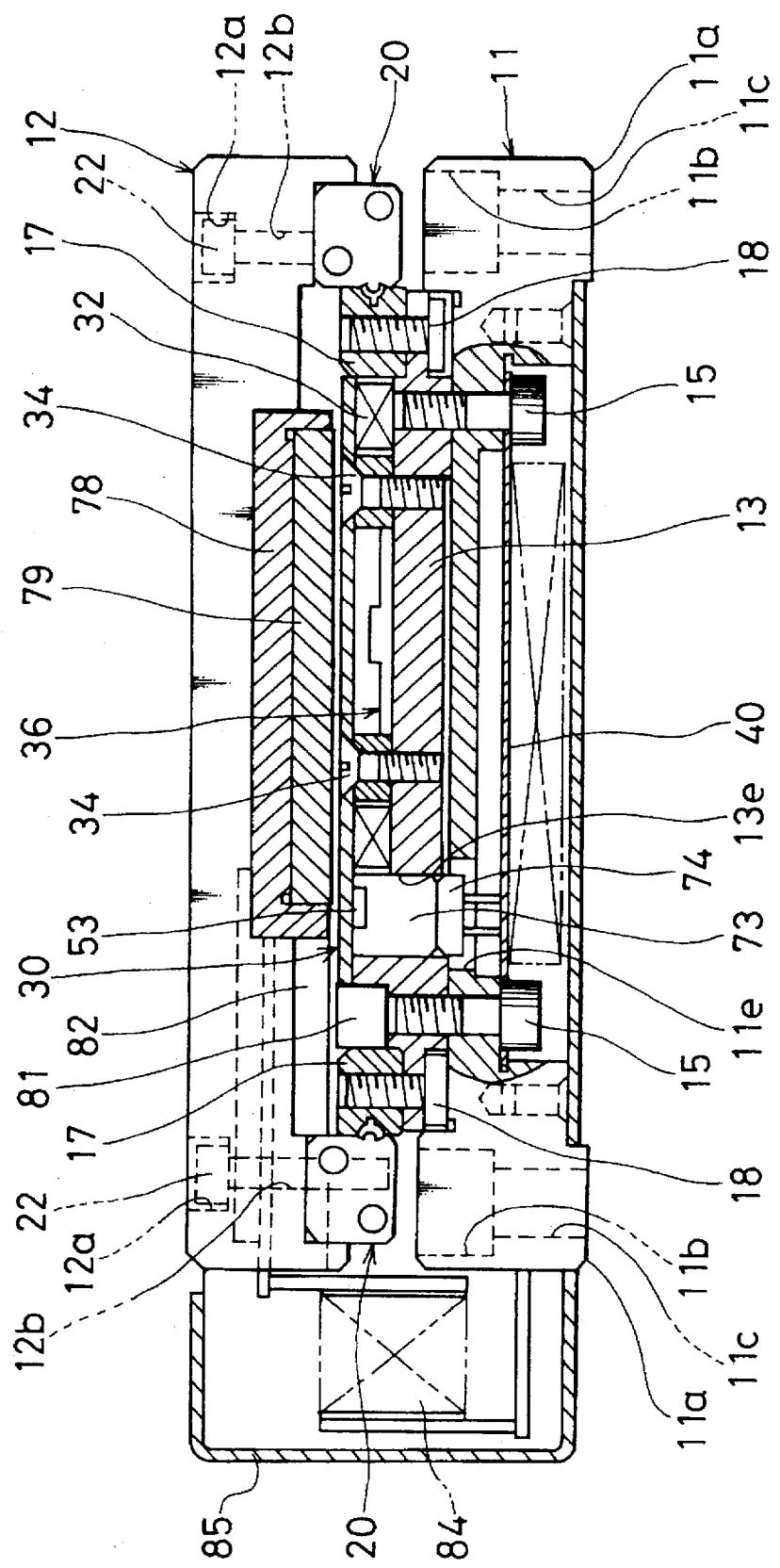
FIG. 4 is a view, including a partial cross-section, taken along arrows II—II relating to FIG. 3.

As shown in FIGS. 2 through 4, this guide unit has bed 11 formed into the shape of a flat plate overall, and table 12, which is to move along the lengthwise direction of said bed 11. As shown in FIGS. 2 and 4, coil yoke 13, having a length roughly the same as that of said bed 11, is formed into the shape of a flat plate on the upper surface of bed 11, and fastened to said bed 11 by a plurality of bolts (with hexagon sockets: see FIG. 4) 15.

Two track rails 17 are arranged along the lengthwise direction of said coil yoke 13 on both sides of the upper surface of said coil yoke 13, and are fastened to said coil yoke 13 by a plurality of small flathead screws 18 (see FIG. 4).

Figure 5:
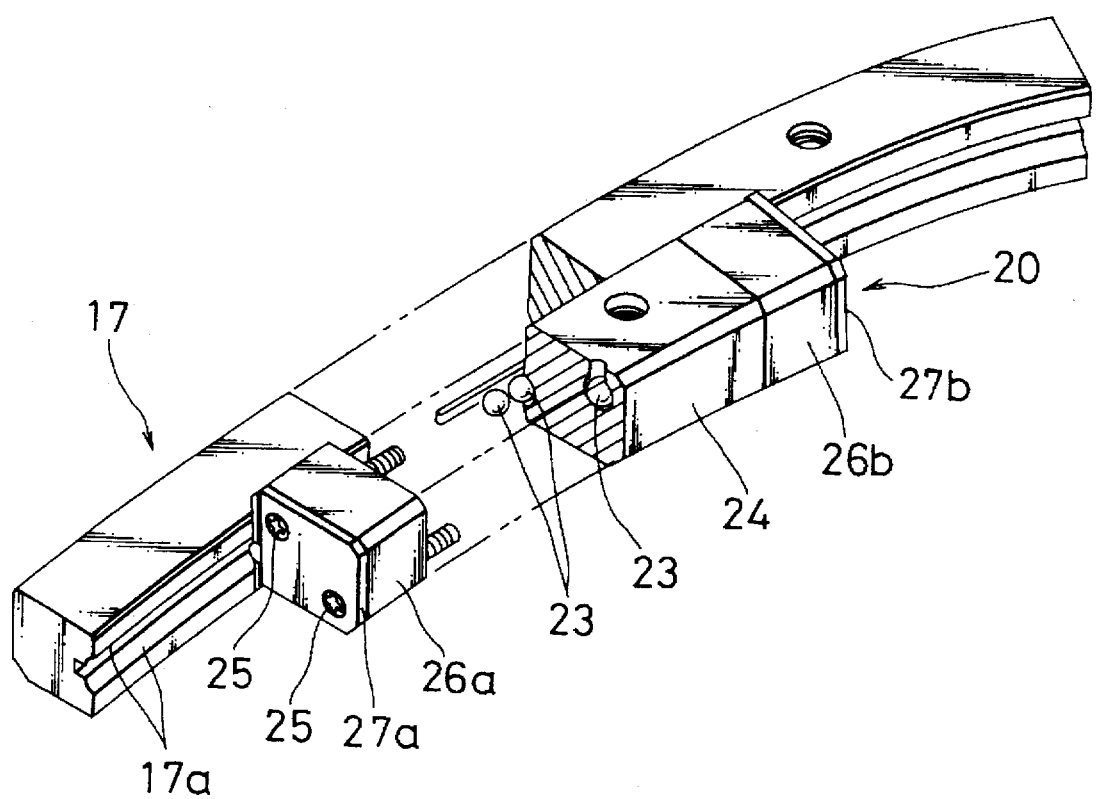
FIG. 5 is a perspective view, including a partial cross-section, of a track rail and slide member equipped on the drive unit shown in FIGS. 2 through 4.

As shown in FIG. 5, a single track in the form of track groove 17a, having a roughly semi-circular shaped cross-section, is formed in the outside portion of the above-mentioned track rails 17. As is clear from FIGS. 2 and 4, a slider in the form of slide member 20, able to freely perform relative movement with respect to said track rails 17, is arranged on the outside of said track rails 17, and is fastened to the lower surface of table 12 by, for example, two bolts (with hexagon sockets) 22. Furthermore, as shown in FIG. 4, countersunk portions 12a and insertion holes 12b, into which the heads and threaded portions of these bolts 22 are respectively inserted, are formed in table 12. Bolts 22 are embedded in these countersunk portions 12a and insertion holes 12b, and do not protrude above the upper surface of table 12.

However, the above-mentioned bed 11, table 12, coil yoke 13, track rails 17 and slide member 20 are formed at an equal curvature over their respective entire lengths in the direction of relative movement. In other words, the above components have the same or substantially the same radii of curvature, and their centers of curvature are coincident with each other. Thus, the overall shape of the drive unit is that of a circular arc. Furthermore, the shape of the drive unit is not limited to a simple circular arc.

By suitably setting the curvature of the drive unit in this manner, said drive unit contributes to diversification of the operating mode of an industrial robot and so forth into which said drive unit is to be incorporated. In addition, a diverse range of constitutions can be realized by combining the drive unit of the prior art, which only performs linear, reciprocating operation, with the drive unit as claimed in the present invention.

A rolling element circulating path (not shown) is formed in the above-mentioned slide member 20, and a large number of rolling elements in the form of balls 23 are arranged and contained in said rolling element circulating path. These balls 23 bear the load between track rails 17 and slide member 20 by circulating while rolling over track grooves 17a accompanying movement of slide member 20 with respect to track rails 17.

As shown in FIG. 5, the above-mentioned slide member 20 has casing 24, a pair of end caps 26a and 26b, coupled to both ends of said casing 24 by countersunk head screws 25, and two seals 27a and 27b fastened together with said end caps 26a and 26b to the outside surfaces of both of said end caps 26a and 26b. The above-mentioned rolling element circulating path is composed of a load bearing track groove and return path formed mutually in parallel so as to linearly pass through casing 24 in the lengthwise direction of said casing 24, and a pair of roughly semicircular direction changing paths formed in both end caps 26a and 26b that connect both ends of said load bearing track groove and return path. Furthermore, said load bearing track groove is in opposition to track groove 17a of track rail 17.

The guide unit having the above-mentioned constitution is fastened to a flat mounting surface equipped on, for example, a machine tool (not shown), by a plurality of bolts (with hexagon sockets: not shown). Consequently, as shown in FIG. 4, bed 11 has flat mounting bottom surface 11a for fixing it to said mounting surface. As shown in FIGS. 2 through 4, countersunk portions 11b and insertion holes 11c are formed in both sides of bed 11 into which the heads and threaded portions of the above-mentioned bolts are inserted for fastening said bed. Said bolts are embedded in these countersunk portions 11b and insertion holes 11c, and do not protrude above the upper surface of bed 11. In addition, as shown in FIGS. 2 and 3, for example, 4 threaded holes 12c are formed in the four corners of the upper surface of table 12 able to move with respect to this bed 11, and a table (not shown), equipped on the apparatus on which the drive unit is equipped, is fastened to said table 12 by bolts (not shown) screwed into these threaded holes 12c.

Continuing, the following provides a detailed description of the primary and secondary sides of the linear direct current motor mutually combined with the guide unit having the constitution described above.

Figure 6:
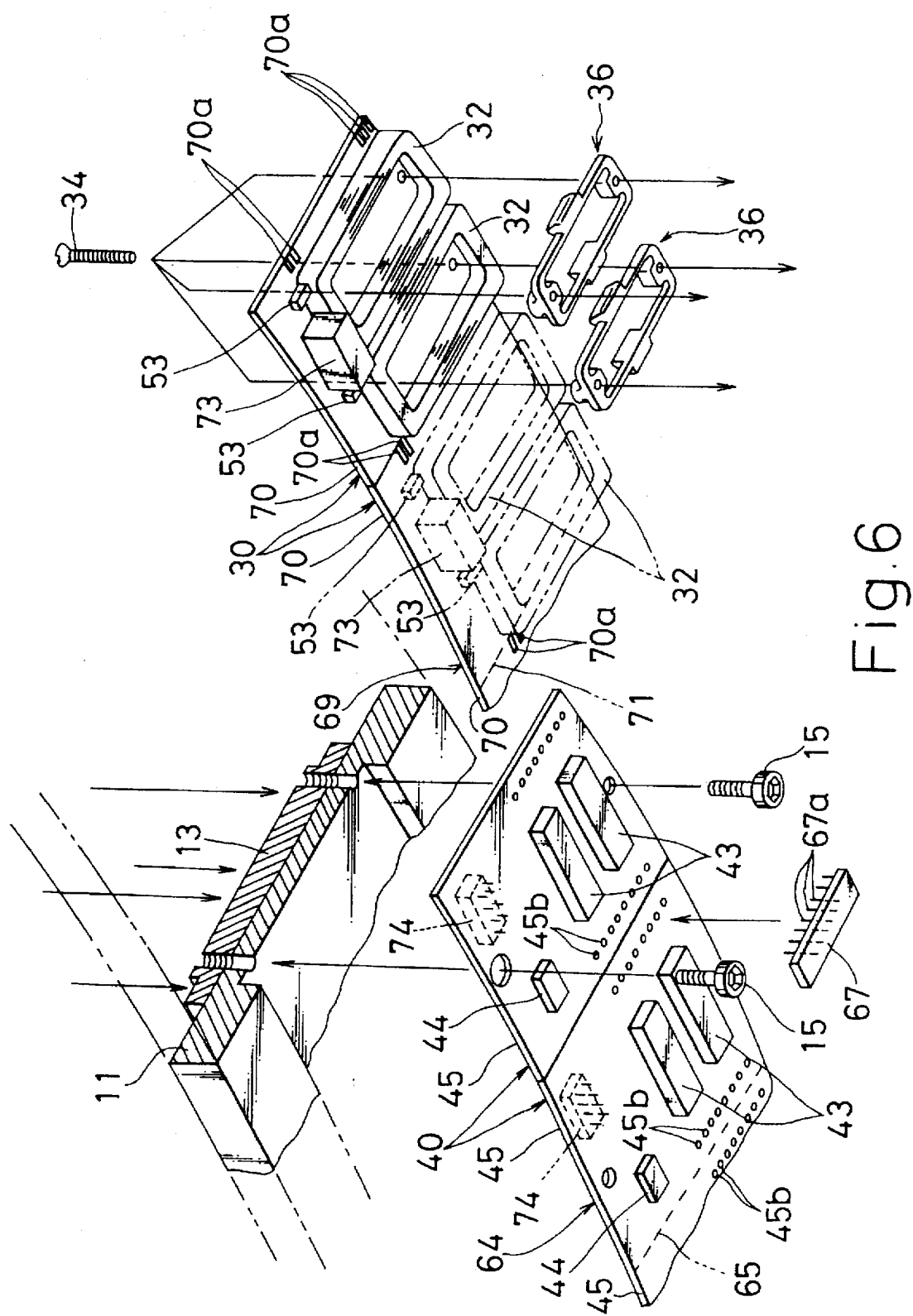
FIG. 6 is an exploded perspective view, including a partial cross-section, of the essential portion of a linear direct current motor contained in the drive unit shown in FIGS. 2 through 4.

To begin with, as shown in FIGS. 2 through 4 and FIG. 6, the primary side has the above-mentioned coil yoke 13 installed on bed 11, coil substrate 30 arranged on the upper surface of coil yoke 13 along the lengthwise direction of said coil yoke 13, for example, and 14 armature coils 32 supported by being affixed in a single row along the direction in which the above-mentioned table 12 is to move on the lower surface of said coil substrate 30, namely the side of coil yoke 13. Furthermore, each armature coil 32 is wound roughly into the shape of a rectangular loop. In addition, as shown in FIGS. 4 and 6, Hall effect elements 53 are provided corresponding to each armature coil 32 on coil substrate 30.

Each of the above-mentioned armature coils 32 and coil substrate 30 are fastened together to coil yoke 13 to the outside of said coil substrate 30 by fastening members in the form of countersunk head screws 34, for example, two each of which are inserted for each of said armature coils 32.

As shown in FIGS. 4 and 6, spacer assemblies 36 are juxtaposed between coil substrate 30, fastened by countersunk head screws 34, and coil yoke 13 into which said countersunk head screws 34 are screwed. These spacer assemblies 36 are provided so that deformation, such as warping and so forth, does not occur in coil substrate 30 caused by tightening of countersunk head screws 34, and are fit inside each armature coil 32.

Next, the following provides an explanation of the circuit substrate for performing supply of electricity and so forth to each of the above-mentioned armature coils As shown in FIGS., 2, 4 and 6, circuit substrate 40 is arranged in parallel with coil substrate 30 on the lower surface of bed 11 on which said coil substrate 30 is installed on its upper surface with coil yoke 13 in between. Moreover, said circuit substrate 40 is fastened to said base member 11 by a plurality of bolts (with hexagon sockets) 15. Furthermore, these bolts 15 serve to fasten the above-mentioned coil yoke 13 to bed 11.

As shown in FIG. 6, the above-mentioned circuit substrate 40 is composed of a plurality of separate portions 45 joined together, each provided with a drive circuit composed of electronic components 43, 44 and so forth. These separate portions 45 are provided corresponding to each unit of two armature coils each of the fourteen armature coils 32 provided in a row. Thus, the number of these separate portions 45, in this case, is seven.

The drive circuit provided on each of the above-mentioned separate portions 45 contains one set of circuit portions supplying excitation current to one armature coil 32, or in other words, a circuit corresponding to two armature coils 32.

Continuing, the following provides a detailed description of the separate constitution of the above-mentioned circuit substrate 40 and coil substrate 30 arranged above it.

To begin with, the following provides an explanation of circuit substrate 40.

In the case of fabricating this circuit substrate 40, a base substrate 64 having a base length (a portion is shown in FIG. 6) is made available. This base substrate 64 is composed of, for example, six separate portions 45, explained based on FIG. 6, joined into a single unit. As was previously described, these separate portions 45 are provided with a drive circuit that performs supply of electrical power and so forth to two armature coils 32 each grouped in the form of individual units. Furthermore, as is shown in FIG. 6, marks in the form of broken lines 65 are printed on both the top and bottom surfaces of base substrate 64 for distinguishing each separate portion 45 (only the bottom surface is shown in the drawing).

Since the previously described circuit substrate 40 must link together seven of the above-mentioned separate portions 45, said circuit substrate 40 is completed by severing one of the six separate portions 45 possessed by the above-mentioned base substrate 64 along the above-mentioned broken line 65 to separate, arranging this separated separate portion 45 in a row at one end of unseparated base substrate 64 as shown in FIG. 6, and mutually connecting their corresponding connection terminals.

Furthermore, in FIG. 6, connection between the above-mentioned separate portions 45 and base substrate 64 is performed by a single connection component 67 having terminals 67a fit into through holes 45b provided at the portion of both connection terminals. Furthermore, although this connection between corresponding connection terminals may be performed using copper wire and so forth, by performing connection using connection component 67 in this manner, in addition to connection of connection terminals 67a being able to be performed all at once, connections are reinforced due to the rigidity of said connection component 67. In addition, in addition to using components that simply act to make electrical connections, electronic components such as IC and so forth may also be used for connection component 67.

The following provides an explanation of coil substrate 30.

Although the overall coil substrate 30 is not shown, in the case of fabricating this coil substrate 30, a base substrate 69 of a length nearly equal to base substrate 64 for the above-mentioned circuit substrate 40 is made available as shown in FIG. 6. This base substrate 69 is composed by linking together six separate portions 70 into a single unit in the same manner as base substrate 64 for circuit substrate 40. As shown in the drawing, two armature coils 32 each are affixed, grouped together in units, on these six separate portions 70, thus making the total number of armature coils 32 arranged in a row on base substrate 69 twelve. Furthermore, as shown in FIGS. 6 and 3, marks in the form of broken lines 71 are printed on the top and bottom surfaces of base substrate 69 to distinguish these separate portions 70. As shown in FIG. 6, circuit substrate 40 is formed by joining and connecting a single separate portion 70 separated from another base substrate (not shown) to one end of this unseparated base substrate 69. Furthermore, in FIG. 6, reference numeral 70a indicates connection terminals provided on each separate portion 70.

Furthermore, in the description thus far, although two armature coils 32 each and a drive circuit for driving said armature coils 32 are separated into units with respect to coil substrate 30 and circuit substrate 40, three or more armature coils 32 and their drive circuit may also be separated into their respective units. In addition, although base substrate 69, which supports twelve armature coils 32, and base substrate 64, on which a plurality of drive circuits are arranged in a row corresponding to two of these armature coils 32 each, are made available during fabrication of the drive unit equipped with a total of fourteen armature coils 32 in the present embodiment, it is only natural that the setting of the total length of these base substrates 64 and 69, namely the number of armature coils and drive circuits to be equipped on these, can be suitably changed.

In addition, although coil substrate 30 and circuit substrate 40 are composed by separating at least one of separate portions 45 and 70 provided on base substrates 64 and 69, and joining it to unseparated base substrates 64 and 69 in the present embodiment, in the case the operating stroke of the drive unit to be fabricated is shorter than the total length of base substrates 64 and 69, at least one of each of separate portions 45 and 70 provided on each of said base substrates 64 and 69 should be cut away as necessary. Thus, by cutting away a portion of a separate portion of a base substrate and joining it to another unseparated base substrate, or simply cutting away a portion of a base substrate, a substrate of a desired length can be obtained as desired. In addition, the remaining portion of the base substrate from which a portion has been cut away as described above can be used for other purposes in any state.

As shown in FIGS. 4 and 6, coil substrate 30 and circuit substrate 40, which are arranged to be mutually separated by bed 11 and coil yoke 13, are connected by connecting a plurality of, in this case seven, of connection devices in the form of both corresponding male and female connectors 73 and 74 provided on mutually opposing sides of both said substrates. One each of these connectors 73 and 74 are arranged with respect to each separate portion 45 and 70 each provided with two armature coils 32 each and their drive circuit grouped into a unit as previously described. As shown in FIG. 4, said connectors 73 and 74 are mutually connected through apertures 11e and 13e formed in bed 11 and coil yoke 13. Thus, since one each of connectors 73 and 74 is provided for each of separate portions 45 and 70 of coil substrate 30 and circuit substrate 40, when mutually assembling both said separate portions 45 and 70, the directions of both can be recognized both quickly and easily, thus facilitating assembly work. Furthermore, connection of corresponding separate portions 45 and 70 may be performed by lead wires and not by connectors as described above. In addition, with respect to the number of connectors, besides providing only one connector for each of separate portions 45 and 70 as mentioned above, two or more connectors may also be provided.

However, as was previously described, the overall drive unit has a prescribed curvature. Thus, the above-mentioned coil substrate 30 and circuit substrate 40 are also formed at this curvature. The electronic components 43 and 44 installed on circuit substrate 40 are not required to be specially fabricated to have said curvature so that commercially available components can be used as shown in FIG. 6. Therefore, the connecting portions (through hole and land) of circuit substrate 40 with each terminal are arranged, in this case, linearly irrespective of the above-mentioned curvature so as to align with the linear arrangement of terminals possessed by each electronic component 43 and 44. As a result of having said constitution, commercially available electronic components, such as IC, can be used, thus being advantageous in terms of costs. However, it goes without saying that each component may also be arranged along the above-mentioned curvature as well.

On the other hand, the secondary side of the linear direct current motor is composed in the manner described below.

Figure 7:
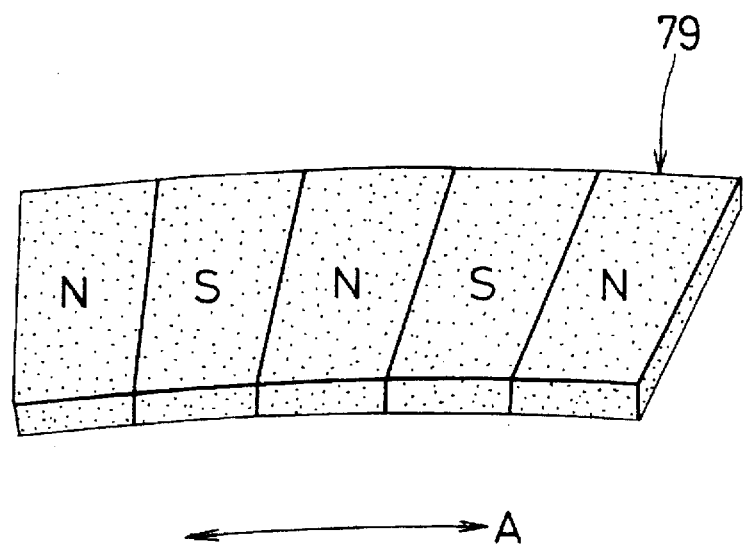
FIG. 7 is a perspective view of a field magnet which is a constituent member of the secondary side of the linear direct current motor contained in the drive unit shown in FIGS. 2 through 4.

As shown in FIGS. 2 and 4, said secondary side has magnet yoke 78, mounted on the lower surface of table 12, and field magnet 79 fixed on the lower surface of said magnet yoke 78 to oppose each of the above-mentioned armature coils 32 of the primary side. As shown in FIG. 7, the overall shape of field magnet 79 is formed into roughly that of a plate at the above-mentioned curvature, and said field magnet 79 is magnetized so that a plurality of N and S magnetic poles, for example 5, are alternately arranged in a row along direction A in which relative movement is performed by the primary and secondary sides, namely the lengthwise direction of bed 11.

In this drive unit, a detection device having the constitution described below is provided for detection of the relative positions of the above-mentioned bed 11 and table 12.

Namely, said position detection device is composed of linear magnetic scale 81 shown in FIGS. 2 through 4, and magnetic sensor portion 82 shown in FIG. 4. Said linear magnetic scale 81 extends in the direction of movement of the above-mentioned table 12, and together with a large number of N and S magnetic poles being alternately magnetized at a precise pitch along its lengthwise direction, an origin signal magnetized portion is formed at one end. Together with providing a Hall effect element for origin detection at magnetic sensor portion 82, two different Hall effect elements of phases A and B are arranged mutually shifted by ½ of the above-mentioned pitch. According to said constitution, both A phase and B phase signals are obtained thereby enabling detection of relative position and determination of direction of movement.

As shown in FIGS. 2 through 4, a cable in the form of flexible substrate 84, for obtaining signals from the above-mentioned magnetic sensor portion 82, and cover 85, which covers said flexible substrate 84, are provided.

As is clear, although the above-mentioned flexible substrate 84 is juxtapositioned between the stationary side and moving side, which respectively contain the primary and secondary sides described above, said flexible substrate 84 is arranged so that its main surface is perpendicular to the direction of radius of curvature R (shown in FIGS. 2 through 4) of the drive unit. Flexible substrate 84 then curves following the above-mentioned curvature accompanying relative movement of said primary and secondary sides. As a result of flexible substrate 84 being provided so that its main surface is perpendicular to the direction of radius of curvature R, it is able to curve smoothly corresponding to relative movement of the primary and secondary sides. Together with this not resulting in any resistance whatsoever with respect to operation of the drive unit, since excessive force is also not applied to the flexible substrate itself, it is able to maintain its function for a long time.

Furthermore, although a constitution is shown in the present embodiment wherein both ends of the above-mentioned flexible substrate 84 are simply connected to the above-mentioned stationary and moving sides, it is also possible to employ the constitution described below.

Figure 8:
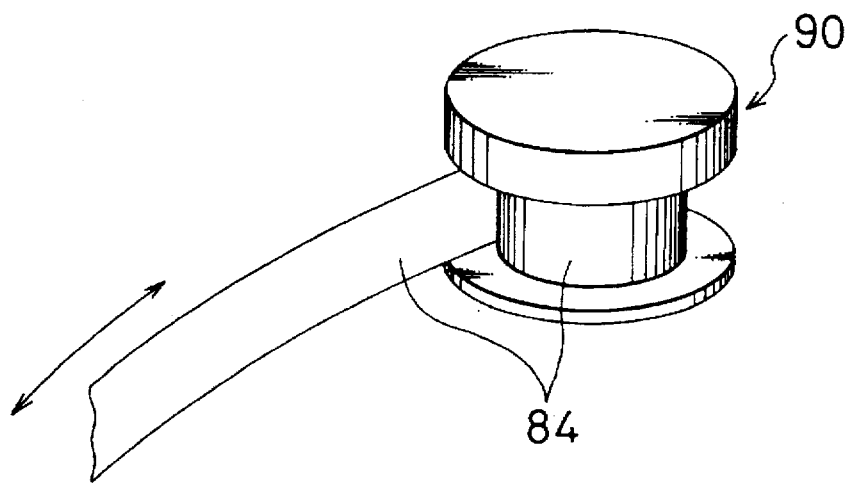
FIG. 8 is a perspective view showing a portion of a reel and a flexible substrate wound onto said reel to be equipped on the drive unit shown in FIGS. 2 through 4.

Namely, as shown in FIG. 8, reel 90 is provided on either the above-mentioned stationary or moving side for winding up the above-mentioned flexible substrate 84. Moreover, a bias force application device (not shown), such as a spring or motor, is provided which applies bias force to said reel 90 in the direction of winding. In said constitution, when the moving side, composed of table 12 and the secondary side, moves in one direction with respect to the stationary side, composed of bed 11 and the primary side, flexible substrate 84 is fed out from said reel 90. During movement in the opposite direction, reel 90 rotates in the opposite direction due to the above-mentioned bias force and flexible substrate 84 is wound onto said reel 90. This type of constitution is effective in cases such as when the operating stroke of the drive unit is long.

In the drive unit of the above-mentioned constitution, by supplying a prescribed current to armature coils 32, thrust is produced based on Fleming's right hand rule between the primary and secondary sides. For example, if a base member, to which the primary side is coupled, is taken to be the stationary side, a moving body, integrated into a single unit with the secondary side, is moved by this thrust. The position of table 12 with respect to bed 11 is then detected by the previously described position detection device.

As has been explained above, by suitably setting the curvature of the drive unit according to the present invention, said drive unit offers the advantage of contributing to diversification of the operating mode of the apparatus into which said drive unit is to be incorporated.

What is claimed is:

1. A drive unit comprising:
    curved track rails having a first radius of curvature;
    curved slide members that slide along said track rails and have a second radius of curvature substantially equal to said first radius of curvature, a center of curvature of said track rails being coincident with a center of curvature of said slide members; and
    a driving device for driving said slide members along said track rails, wherein
    said driving device comprises an electromagnetic actuator and said electromagnetic actuator comprises a linear direct current motor having a primary side supported between said track rails and a secondary side connected to said slide members, said primary side comprising a bed on which armature coils and a substrate are supported, said secondary side comprising a field magnet arranged so as to oppose said armature coils, wherein said bed, said substrate and said field magnet have a radius of curvature substantially equal to the radius of curvature of said track rails and said slide members, said drive unit further comprising:
    a position detecting device connected to at least one of said slide members, and
    a flexible substrate for transmitting and receiving electrical signals indicative of a relative position of said slide members with respect to said track rails, said flexible substrate being connected between said position detecting device and said primary side of said electromagnetic actuator, said flexible substrate being disposed so as to be flexible in a radial direction of said track rails and said slide members, said flexible substrate being disposed so as to follow the curvature of said track rails as said slide members slide along said track rails, and wherein
    said slide members each comprise:
        a rolling element circulating path containing a load bearing track which confronts one of said track rails; and
    rolling elements arranged and contained in said rolling element circulating path which circulate with relative movement of said track rails and said slide members.

2. The drive unit as set forth in claim 1, further comprising a reel around which said flexible substrate is wound, and a bias force application device for applying a bias force to said reel to wind said flexible substrate in on said reel.

3. The drive unit as set forth in claim 1, wherein said said substrate comprises a coil substrate for supporting said armature coils and a circuit substrate for supplying electricity to said armature coils, said primary side further comprising:

electronic components having terminals which are connected to said circuit substrate, wherein connecting portions of said circuit substrate for connecting said terminals are disposed in predetermined positions irrespective of the curvature of said track rails.

4. The drive unit as set forth in claim 1, wherein said substrate comprises:

a circuit substrate having drive circuits for supplying electricity to said armature coils; and a coil substrate which supports said armature coils, wherein said circuit substrate comprises a plurality of separate portions each having one or more of said drive circuits, said separate portions of said circuit substrate being connected to each other to form a single unit, and wherein said separate portions of said circuit substrate can be separated from and added to said single unit to adjust a total number of drive circuits in said single unit, and wherein said coil substrate comprises another plurality of separate portions each supporting one or more of said armature coils, said separate portions of said coil substrate being connected to each other to form another single unit, and wherein said separate portions of said coil substrate can be separated from and added to said another single unit to adjust a total number of armature coils in said another single unit.

5. A drive unit as recited in claim 1, further comprising two track rails and two slide members, wherein a table is connected to and supported between said slide members, said table having a third radius of curvature substantially equal to said first and second radii of curvature.

* * * * *